United States Patent [19]

Gatarz et al.

[11] Patent Number: 5,118,380
[45] Date of Patent: Jun. 2, 1992

[54] RIM FLEXIBLE MANUFACTURING INSERT

[75] Inventors: Gregory M. Gatarz; Robert M. Jensen, both of East Brunswick, N.J.; Ronald M. Marsilio, Mogadore, Ohio

[73] Assignee: American Standard Inc., New York, N.Y.

[21] Appl. No.: 689,424

[22] Filed: Apr. 23, 1991

[51] Int. Cl.⁵ ............................................. B29C 33/24
[52] U.S. Cl. ................................... 156/500; 425/346; 425/412
[58] Field of Search ............... 156/245, 500; 425/346, 425/412, 414, 416, 542, 504; 264/328.1, 328.7

[56] References Cited

U.S. PATENT DOCUMENTS

| | | |
|---|---|---|
| 1,072,448 | 9/1913 | Grundstrom . |
| 2,387,839 | 10/1945 | Frost . |
| 3,496,612 | 2/1970 | Ruggles et al. ............... 425/346 |
| 3,503,327 | 3/1970 | Lenz . |
| 3,667,891 | 6/1972 | Gelin . |
| 3,988,099 | 10/1976 | Hehl ............................. 425/542 |
| 4,664,982 | 5/1987 | Genovese et al. ............. 428/448 |
| 5,033,955 | 7/1991 | Faig et al. .................... 425/412 |
| 5,040,962 | 8/1991 | Waszeciak et al. ........... 425/412 |

Primary Examiner—Caleb Weston
Attorney, Agent, or Firm—Blum Kaplan

[57] ABSTRACT

A manufacturing insert for a molding press having an upper movable platen adapted to support a male mold member and a fixed lower platen adapted to support a female mold member. The molding press includes a mix head system and a hydraulic ejector system supported below the fixed lower platen. The manufacturing insert includes a table having a platen surface with legs depending downwardly therefrom, the legs being removably securable to the fixed lower platen of the molding press. The platen surface includes an enlarged opening therethrough. A mix head support system is supported below the platen surface intermediate the legs of the table. The mix head support system includes a mix head support for supporting a mix head and a slide system for permitting three dimensional movement of the mix head support to permit movement of the mix head from a first position where the mix head extends through the enlarged opening in the platen surface and to a second position where the mix head is beyond the upper platen.

6 Claims, 7 Drawing Sheets

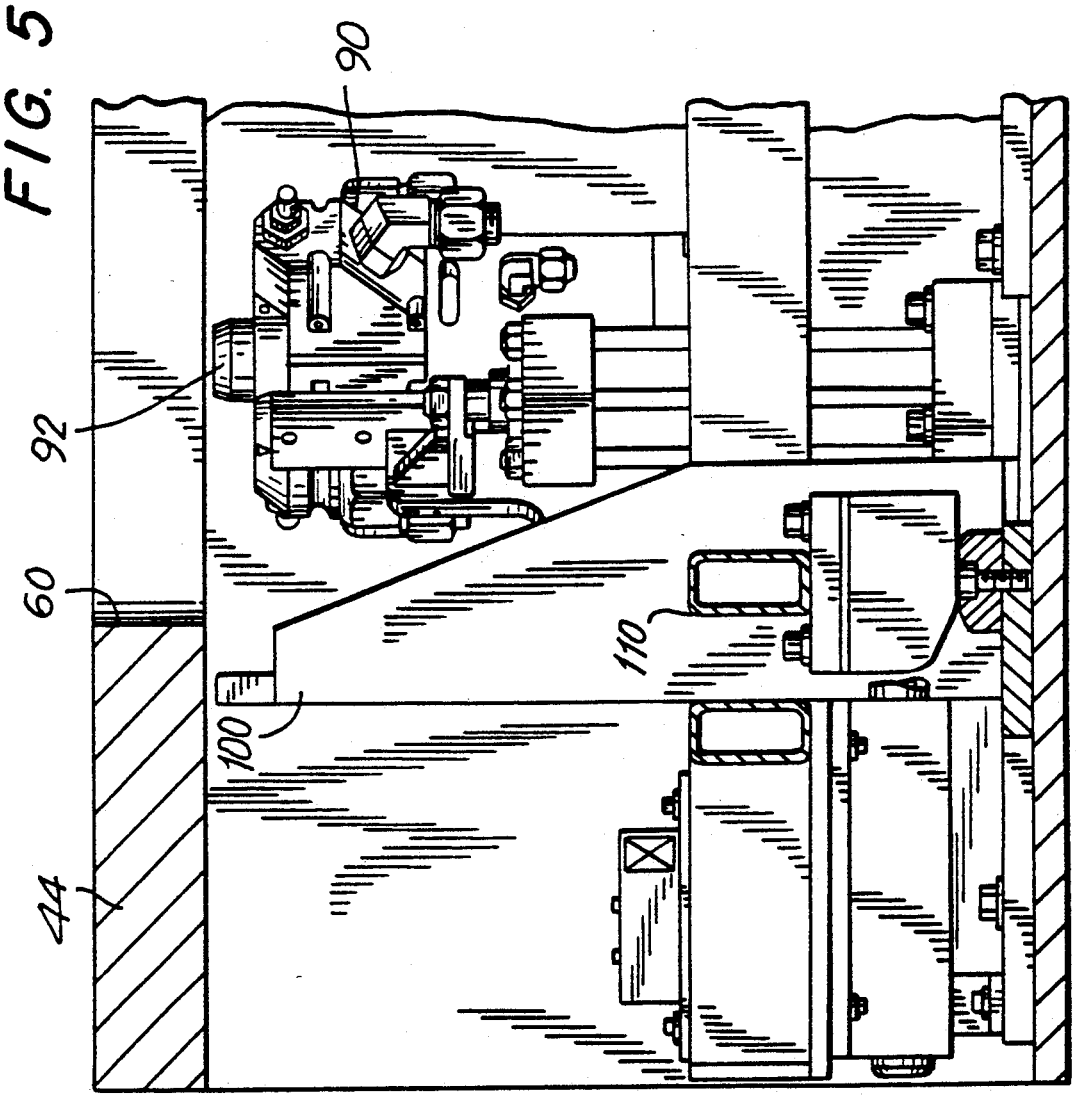

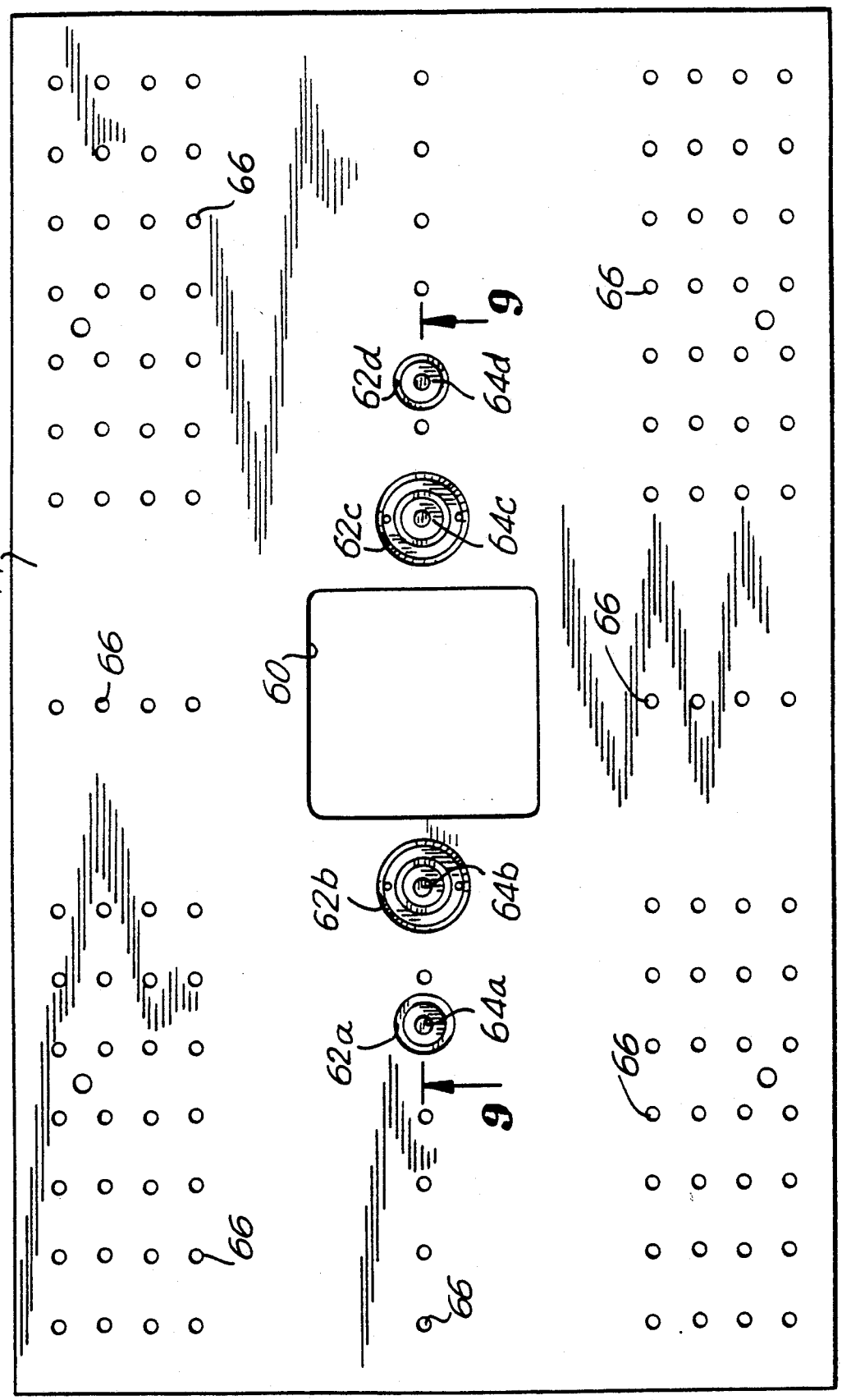

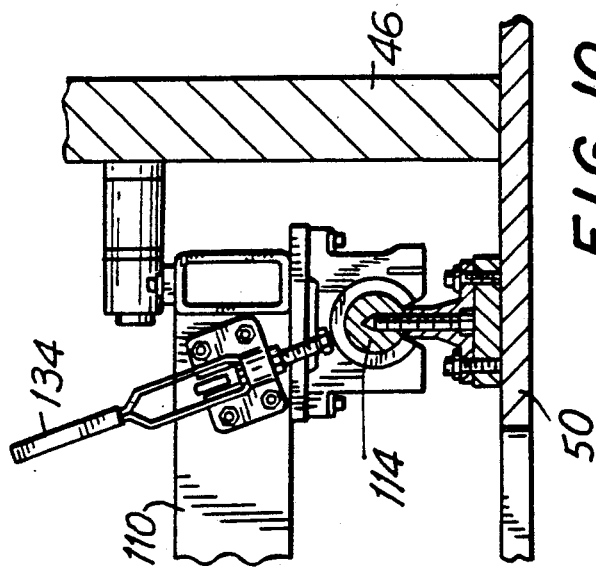
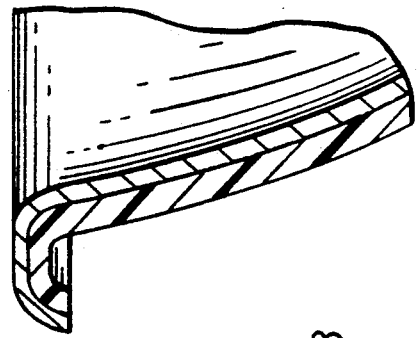
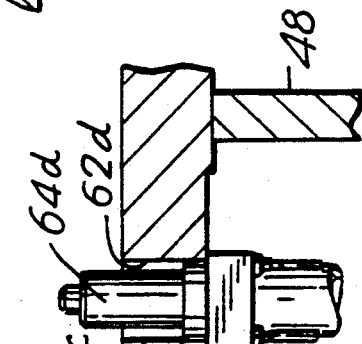
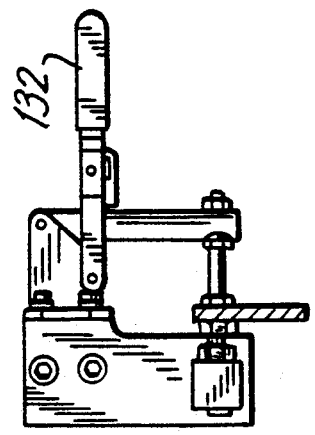
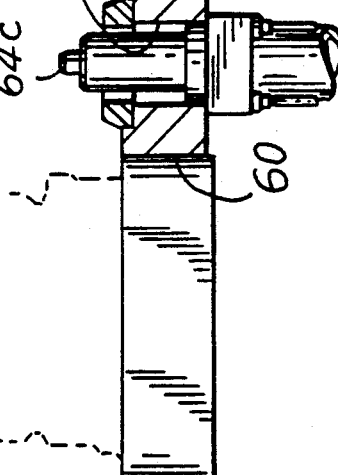
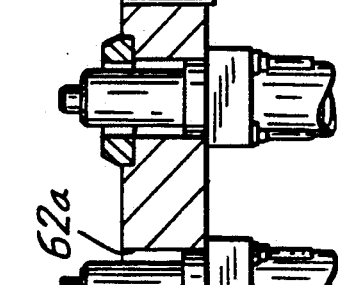
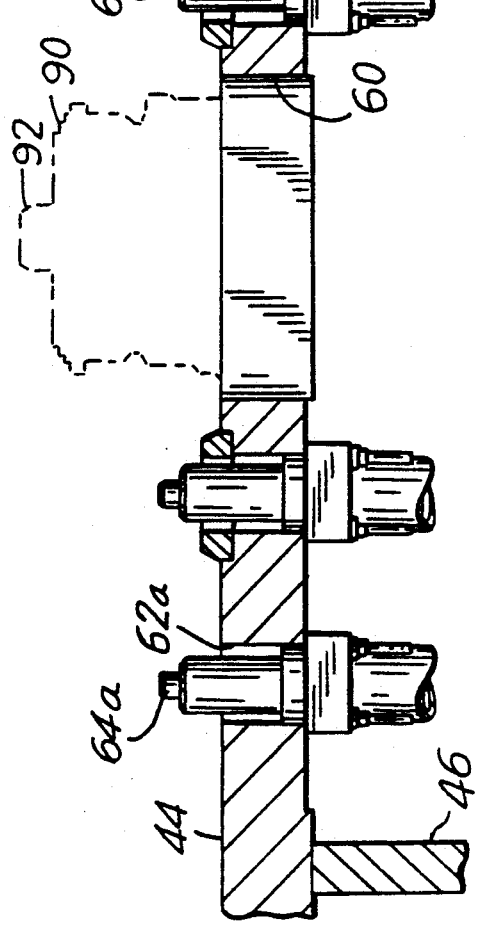
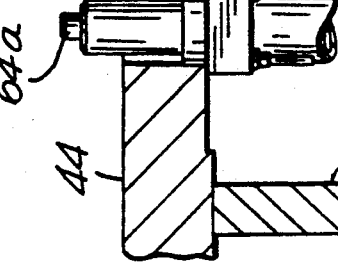

RIM FLEXIBLE MANUFACTURING INSERT

BACKGROUND OF THE INVENTION

The present invention is directed generally to molding presses used for applying a coating of plastic material on the underside of sanitary fixtures such as tubs, sinks, lavatories and the like and, in particular, to a molding press insert table which is placed in the clamp of the press on top of the original lower platen to enable the molding of smaller sanitary fixtures such as sinks, lavatories and the like.

Recently, porcelain cast-iron bathtubs and smaller sanitary fixtures such as sinks have been replaced with composite enamel steel structures of substantially less weight than the prior fixtures but having the look and feel of such earlier fixtures. The composite structures are lighter, have a high structural strength and resist cracking and delamination when subjected to impact, thermal shock or the weight of a user.

A disclosure of such composite structures is found in commonly assigned U.S. Pat. No. 4,664,982. This patent discloses sanitary fixtures having the look and feel of early porcelain cast-iron fixtures. The composite enamel steel fixture is formed from a steel shell, the top surface of which may be coated with enamel and the underside or non-finish surface thereof being coated with a layer of plastic material through reaction injection molding (RIM) or by reinforced reaction injection molding (RRIM) techniques. Other disclosures of such improved sanitary fixtures may be found in commonly assigned U.S. Pat. Nos. 4,664,092, 4,844,944 and 4,844,955.

Typically, in manufacturing such composite molded large sanitary fixtures such as tubs, a shell having a finish and a non-finish side is inserted into a female mold receptacle forming a cavity between the molding receptacle surface and the non-finish portion of the shell. The platen on which the female mold is placed is generally at floor level, with the operative components of the press including the mix head system and ejector system being found below floor level. A male molding portion is supported on an upper moveable platen and includes a surface which substantially conforms to the finish surface contour of the shell. The upper platen is urged downwardly against the finish side of the shell to hold the shell in the female mold portion. The desired polymeric material is injected from the mix head through a bushing into the mold to coat the non-finish side of the shell. The upper platen is then moved away thereby releasing the male mold member from the shell to permit removal of the shell from the female mold portion.

While such larger presses having the platen at floor level are acceptable for use in molding large sanitary fixtures such as tubs, such large molding presses cannot be used to mold smaller sanitary fixtures such as sinks, lavatories or the like because the top platen will not move close enough to the bottom platen to hold the shell in place. This is known as "daylight". In the past, to overcome this "daylight" problem when smaller molds are used, an appropriate spacer was placed on the top platen thereby permitting the male mold portion supported on the top platen to travel farther down. Such modification of the top platen has proven less than completely satisfactory in actual manufacturing situations.

Accordingly, it is desired to provide a manufacturing insert for a molding press which is supported on the original bottom platen of the press to permit the use of smaller molds for molding smaller sanitary fixtures.

SUMMARY OF THE INVENTION

Generally speaking, in accordance with the present invention, a manufacturing insert for a molding press having an upper movable platen adapted to support a male mold member and a fixed lower platen adapted to support a female mold member, is provided. The molding press includes a mix head system and a hydraulic ejector system supported below the fixed lower platen. The manufacturing insert includes a table having a platen surface with legs depending downwardly therefrom with the legs being removably securable to the fixed lower platen of the molding press. The platen surface includes an enlarged opening therethrough. A mix head assembly is supported below the platen surface intermediate the legs of the table. The mix head assembly includes a mix head support for supporting a mix head and a slide system for permitting three dimensional movement of the mix head support to permit movement of the mix head from a first position where the mix head support extends through the enlarged opening in the platen surface and a second position where the mix head support extends outwardly beyond the legs of the table.

In a preferred embodiment, the slide system includes slide rods supported intermediate the legs of the table to permit two dimensional X-Y movement of the mix head support and a vertical slide mechanism to permit up and down movement of the mix head support. The mix head support with mix head can be readily coupled to the mix head system of the molding press. In addition, the platen surface may include a plurality of openings for receiving hydraulic ejector cylinders which can be readily coupled to the hydraulic ejector system of the molding press.

The manufacturing insert raises the level of the female mold member to a convenient working height and permits a large molding press to be used to mold smaller sanitary fixtures.

Accordingly, it is an object of the present invention to provide a flexible manufacturing insert for a molding press.

Another object of the present invention is to provide a RIM flexible manufacturing insert for a molding press which raises the level of the female mold to a convenient working height.

A further object of the present invention is to provide a manufacturing insert for a molding press which includes a movable mix head support system which can be coupled to the mix head system of the press in which it is used.

Yet another object of the present invention is to provide a manufacturing insert for a large molding press used to mold large sanitary fixtures such as tubs or the like to permit the molding of small sanitary fixtures such as sinks, lavatories and the like.

Still another object of the present invention is to provide a manufacturing insert for a molding press which is readily moved into and out of position in the molding press to provide flexibility to the molding press.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 5 is an enlarged sectional view taken along line 5—5 of FIG. 2;

FIG. 6 is a top plan view of the platen surface viewed along line 6—6 of FIG. 1;

FIG. 7 is a sectional view taken along line 7—7 of FIG. 2;

FIG. 8 is a sectional view taken along line 8—8 of FIG. 2;

FIG. 9 is a sectional view taken along line 9—9 of FIG. 6; and

FIG. 10 is a partial sectional view of a molded sanitary fixture formed using the manufacturing insert of the present invention.

DESCRIPTION OF THE PREFERRED EMBODIMENTS

Figure 1:
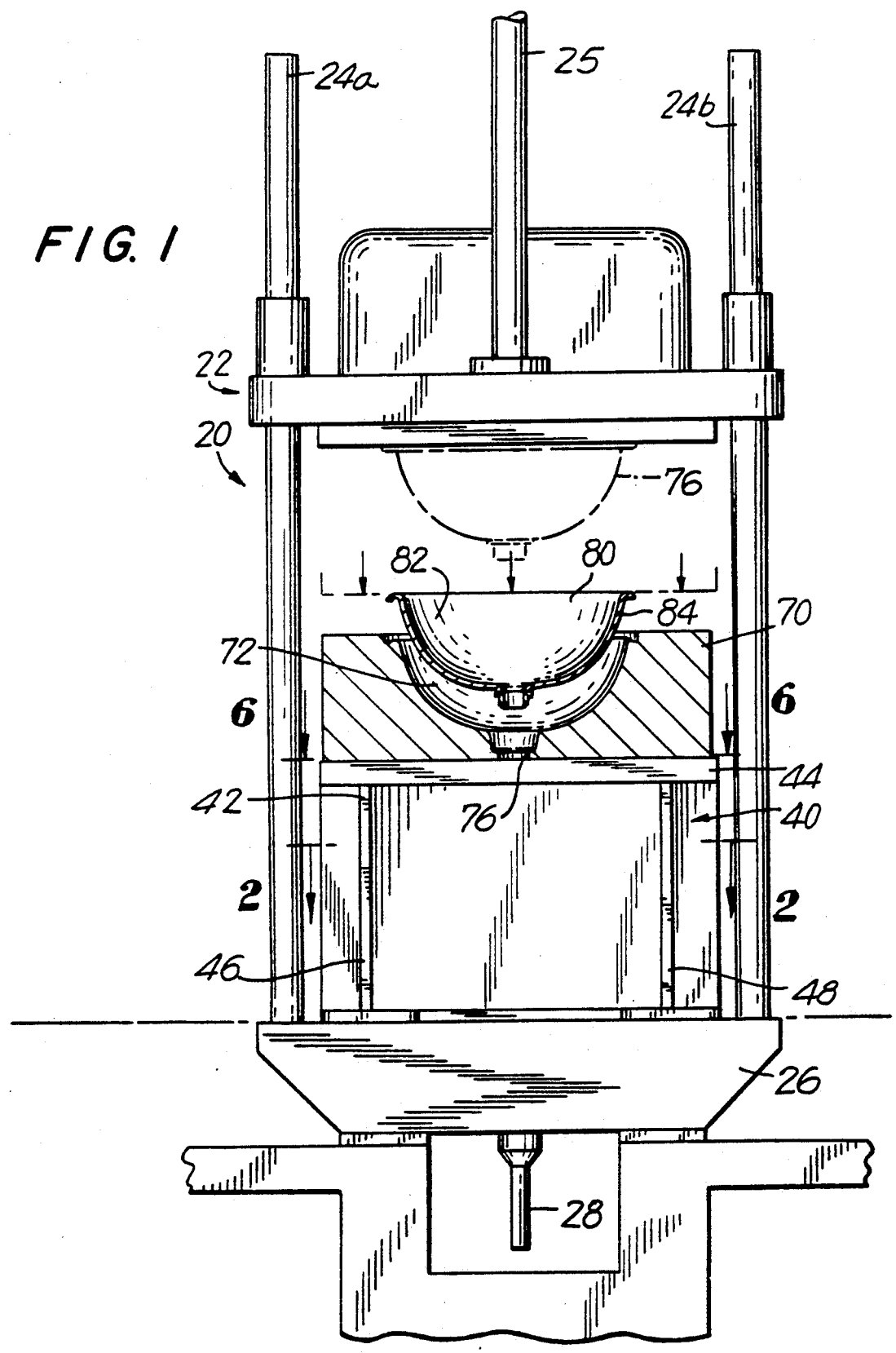
FIG. 1 is a front elevational view of a molding press using a flexible manufacturing insert constructed in accordance with a preferred embodiment of the present invention.

Reference is first made to FIG. 1 which depicts a molding press, generally indicated at 20, including a manufacturing insert, generally indicated at 40, constructed in accordance with a preferred embodiment of the present invention. Molding press 20 is a conventional large molding press used generally for molding large articles such as bathtubs or the like. As described in commonly assigned U.S. Pat. No. 4,664,982, mold 20 may be used to apply a plastic layer to the underside non-finish surface of a bathtub.

When used conventionally for molding large items, molding press 20 includes an upper platen 22 slidably supported on guide rods 24a and 24b operated by an arm 25 to which a male mold member is secured. A lower fixed platen 26 at floor level supports a female mold member. The male and female mold members conform generally to the shape of the respective finish and underside non-finish surfaces of the tub to be molded. The operative molding components of molding press 20, such as mix head 28, are housed below lower platen 26 and hence below floor level.

During the molding operation for a bathtub, the tub to be molded is placed in the female mold member supported on lower platen 26, and upper platen 22 is moved downwardly to insert the male mold member within the concavity of the bathtub. Mix head 28 then injects the appropriate plastic material into the mold to coat the underside surface of the tub. After curing, upper platen 22 is moved upwardly and the finished bathtub is then removed from the mold using a hydraulically operated ejector system, the operative components of which are also housed below floor level of platen 26.

While such large molding presses such as molding press 20 are suitable for molding large articles, they have proven unsuitable for molding smaller articles such as sinks, lavatories and the like since upper platen 22 cannot be moved downwardly far enough to properly insert the male mold member against the sanitary fixture to be molded. In the past, a spacer was placed on the undersurface of the upper platen to accommodate smaller molds. The use of such a spacer has proven less than completely satisfactory in actual manufacturing operations. Accordingly, the present invention provides a manufacturing insert 40, the construction and use of which is described below in detail.

Referring now additionally to FIGS. 2 through 9, it is seen that manufacturing insert 40 is in the form of a table 42 having a raised platen surface 44 supported by first and second legs 46 and 48. The height of legs 46 and 48 is such as to place platen surface 42 at a convenient working height. Feet 50 and 52 are provided at the bottom of legs 46 and 48, respectively, to provide stability thereto, to secure table 42 to the platen and to support various components housed under platen surface 44.

As best depicted in FIG. 6, platen 44 includes an enlarged central opening 60 through which a mix head is inserted. Platen 44 also includes four smaller circular openings 62a through 62d through which hydraulic cylinders 64a through 64d respectively extend. Additionally, a plurality of small openings 66 are provided to permit proper mounting of various female mold members on platen 44.

Referring to FIG. 1, it is seen that a female mold member 70 is supported and secured on platen surface 44. Sink 80 includes a finish surface 82 and a non-finish surface 84 on its underside. Female mold member 70 includes a receptacle 72 shaped to conform to the shape of sink 80 which is received therein. A male mold member 76 is supported on upper platen 22 and is shaped to be received in sink 80 during the molding process. Female mold 70 includes an opening 76 in the bottom thereof through which the mix head is inserted to inject the plastic material which will coat non-finish surface 84 of sink 80.

Figure 2:
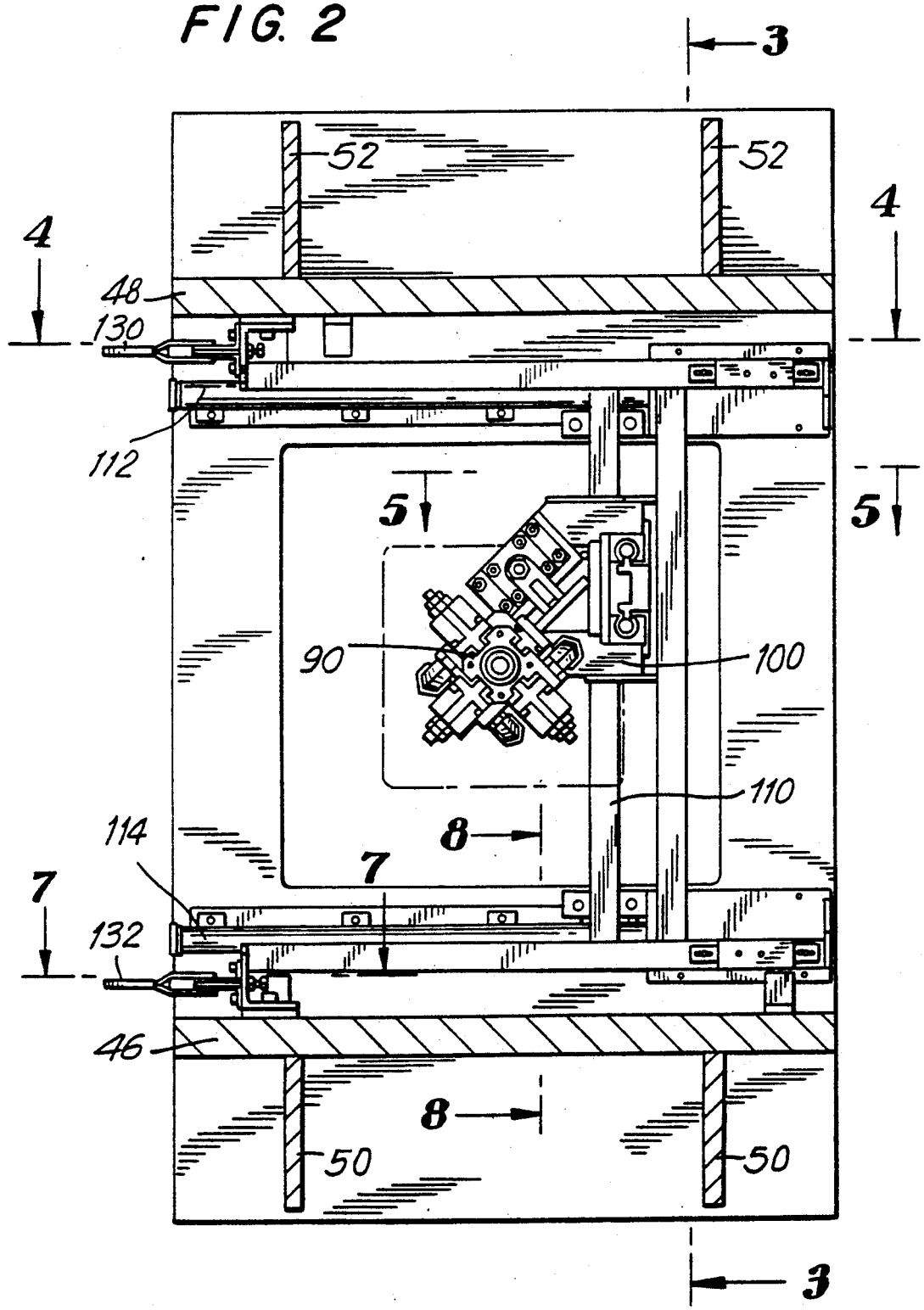
FIG. 2 is an enlarged sectional view taken along line 2—2 of FIG. 1.
Figure 3:
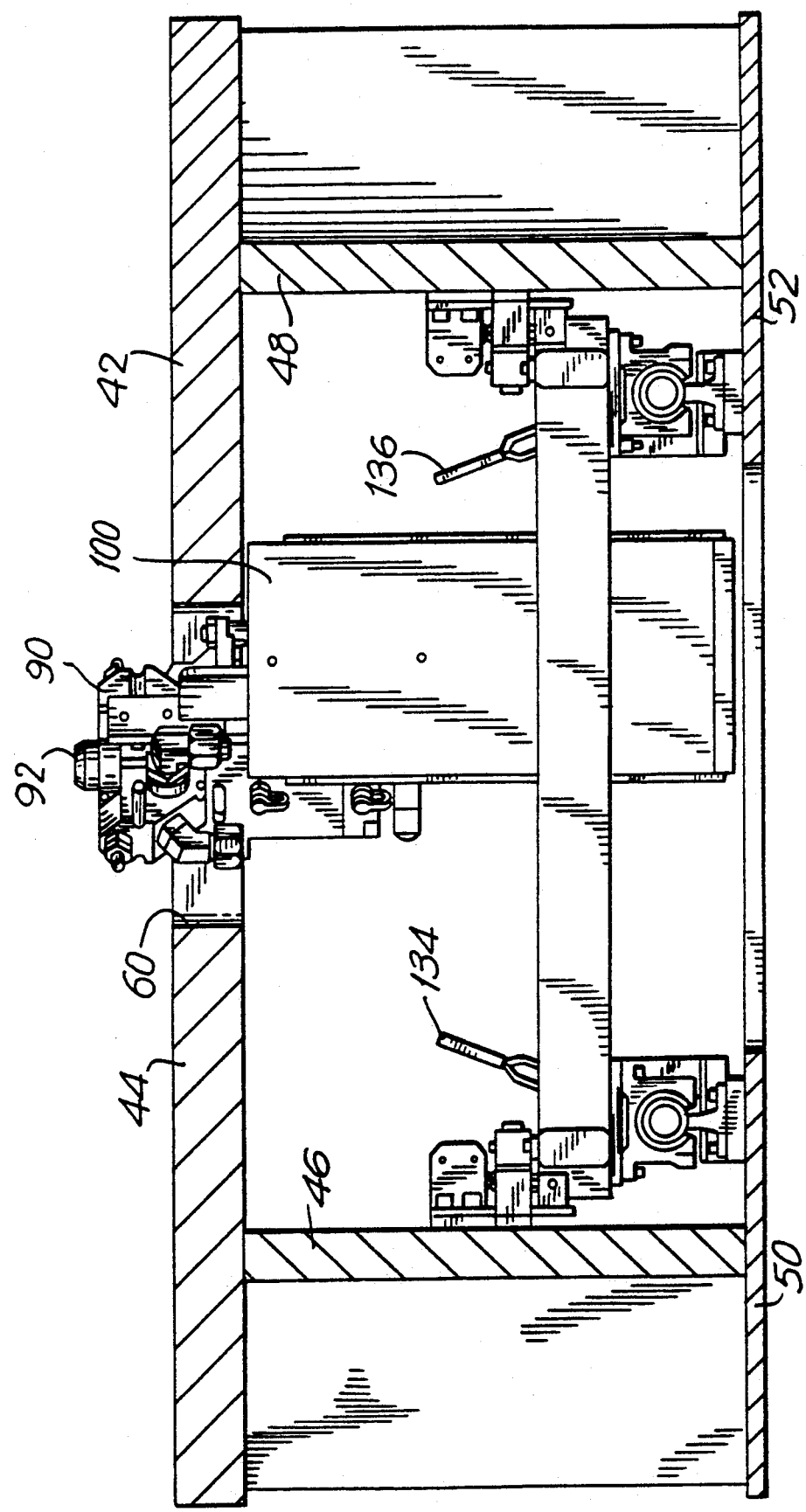
FIG. 3 is a sectional view taken along line 3—3 of FIG. 2.
Figure 4:
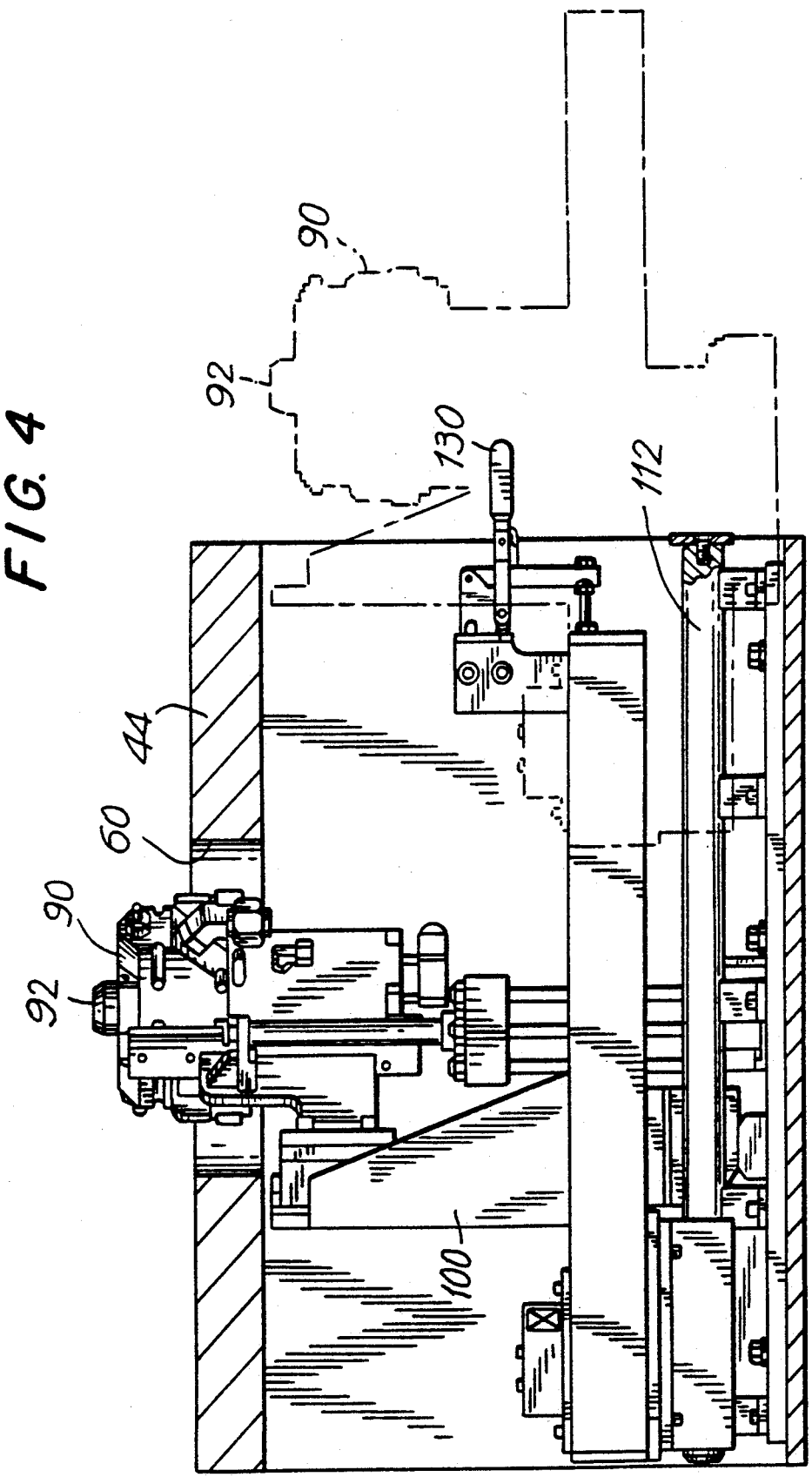
FIG. 4 is a sectional view taken along line 4—4 of FIG. 2.

Referring additionally to FIGS. 2 through 4, it is seen that a mix head assembly 90 including mix head 92 is supported by a carriage 100. Mix head assembly 90 is slidably supported on carriage 100 for up and down movement with respect thereto. Such movement can be done manually or with an automatic system. FIGS. 3 and 4 show mix head assembly 90 extending through enlarged opening 60 in platen 44 in its mold position. FIG. 5 shows mix head assembly 90 in its lower retracted position below platen surface 44.

As best depicted in FIG. 2, carriage 100 is slidably supported on a guide rail 110 which itself is slidably supported on opposing cross rails 112 and 114. Accordingly, in addition to be movable upwardly and downwardly with respect to platen surface 44, mix head assembly 90 can be moved both longitudinally and laterally to permit proper positioning thereof through opening 60 as well as to permit movement of mix head assembly 90 outside of manufacturing insert 40 to permit maintenance to be performed thereon. Various toggle clamps and locking arms 130, 132, 134 and 136 are provided for locking mix head assembly 90 in any desired position.

FIG. 9 depicts the four hydraulic cylinders 64a through 64d which are utilized in connection with ejector pins provided in female mold member 70 to assist in ejecting the finished product from the mold. The hydraulic cylinders are used in pairs on opposite sides of mix head assembly 90 so that one of hydraulic cylinders 64a or 64b are used with one of hydraulic cylinders 64c or 64d.

Mix head assembly 90 can be coupled through appropriate hoses and couplings to the mix head system contained as part of molding press 20. Similarly, hydraulic cylinders 64a through 64d can be appropriately coupled to the conventional ejector system included as a part of molding press 20.

Hence, when it is desired to mold a smaller sanitary fixture in large molding press 20, manufacturing insert 40 is positioned on regular lower platen 26 and then bolted or otherwise secured thereto through feet 50 and 52. Female mold member 70 is placed on platen surface 44 at the convenient height provided and is affixed thereto through the appropriate openings 66. The appropriate two of hydraulic cylinders 62a through 62d are coupled to the pin ejector system of the female mold and mix head assembly 90 is moved into position. The various electrical, fluid and hydraulic couplings can then be made to the corresponding couplings provided by molding press 20. The molding procedure can then proceed as discussed above. When maintenance is required on mix head assembly 90, assembly 90 can be moved downwardly and out from under platen surface 44 to the position depicted in phantom in FIG. 4.

FIG. 10 shows a cross-sectional portion of sink 80 including its finish surface 82 and non-finish surface 84 which has now been coated with a plastic material 86 after the molding process.

The manufacturing insert of the present invention provides manufacturing flexibility for molding large or small products on the same molding equipment including, for example, molding presses of 50, 75 or 100 tons. Molds of all sizes can then be utilized in connection with a single large molding press. The manufacturing insert provides a positive mold locator system using the appropriate opening 66, a ready ejector system attachment and selectable ejector cylinder locations to accommodate non-symmetrical mold mounting.

In addition, the mix head assembly permits automatic or manual vertical movement and horizontal manual movement. The vertical movement is used to engage and disengage the mix head from the mold. The horizontal movement is used for convenient access to the mix head assembly for adjustment and/or repair. The manufacturing insert also places small molds at a convenient working height to assist in the loading of the molds and the unloading of the molded units. Mold servicing is also facilitated.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A manufacturing insert for a molding press having an upper movable platen adapted to support a male mold member and a fixed lower platen adapted to support a female mold member, said molding press including a mix head system and a hydraulic ejector system supported below said fixed lower platen, comprising a table having a platen surface with legs depending downwardly therefrom, said legs being removably securable to said fixed lower platen of said molding press, said platen surface including an enlarged opening therethrough, a mix head support system supported below said platen surface intermediate the legs of said table, said mix head support system including a mix head support for supporting a mix head and slide means for permitting three dimensional movement of said mix head support to permit movement of said mix head from a first position where said mix head extends through said enlarged opening in said platen surface and to a second position where said mix head is beyond said lower platen.

2. The manufacturing insert as claimed in claim 1, wherein said platen surface includes a plurality of additional openings, and further comprising a plurality of hydraulic cylinders, each of which extends through one of said plurality of additional openings.

3. The manufacturing insert as claimed in claim 1, wherein said platen surfaces includes a plurality of through holes for fixing said female mold member to said platen surface.

4. The manufacturing insert as claimed in claim 1, wherein said mix head support includes a carriage, said carriage slidably supporting said mix head for vertical movement with respect thereto, said carriage being slidably supported on said slide means for permitting said carriage to be moved horizontally along said slide means.

5. The manufacturing insert as claimed in claim 1, wherein the height of said legs are predetermined to place said platen surface at a convenient working height.

6. The manufacturing insert as claimed in claim 1, wherein said slide means includes locking means for locking said mix head support in a desired position.

* * * * *